(12) United States Patent
Ono

(10) Patent No.: US 6,176,557 B1
(45) Date of Patent: Jan. 23, 2001

(54) INNER PERIPHERY DRIVING TYPE RUBBER CRAWLER

(75) Inventor: Yoshihiko Ono, Yokohama (JP)

(73) Assignee: Bridgestone Corporation, Tokyo (JP)

( * ) Notice: Under 35 U.S.C. 154(b), the term of this patent shall be extended for 0 days.

(21) Appl. No.: 09/220,591

(22) Filed: Dec. 28, 1998

(30) Foreign Application Priority Data

Jan. 10, 1998 (JP) .................................................. 10-014797
Feb. 2, 1998 (JP) .................................................. 10-036687
Feb. 4, 1998 (JP) .................................................. 10-039577

(51) Int. Cl.$^7$ .................................................. B62D 55/24
(52) U.S. Cl. .......................... 305/177; 305/173; 305/174; 305/176
(58) Field of Search .................................... 305/160, 165, 305/167, 169, 170, 171, 172, 173, 174, 175, 176, 177, 193, 195, 196, 197, 198

(56) References Cited

U.S. PATENT DOCUMENTS

| | | |
|---|---|---|
| 3,118,709 | 1/1964 | Case . |
| 3,721,477 | 3/1973 | Cooper et al. . |
| 3,774,979 | 11/1973 | Harris . |
| 3,779,617 | 12/1973 | Palmaer . |
| 3,900,231 | 8/1975 | Ohm . |
| 4,863,420 | 9/1989 | Ivy . |
| 4,948,201 | * 8/1990 | Furuta .................................. 305/169 |
| 5,131,728 | 7/1992 | Katoh et al. . |
| 5,380,076 | * 1/1995 | Hori ..................................... 305/171 |
| 5,540,489 | * 7/1996 | Muramatsu et al. .................. 305/195 |
| 5,984,438 | * 11/1999 | Tsunoda et al. ...................... 305/169 |

FOREIGN PATENT DOCUMENTS

| | | |
|---|---|---|
| 1020990 | 11/1977 | (CA) . |
| 33 19 067 A1 | 11/1984 | (DE) . |
| 0 419 424 A2 | 3/1991 | (EP) . |
| 0515683A1 | 12/1992 | (EP) . |
| 2 107 614 | 5/1972 | (FR) . |
| 1126170 | 9/1968 | (GB) . |
| 355140663 | * 11/1980 | (JP) ..................................... 305/169 |
| 404201786 | * 7/1992 | (JP) ..................................... 305/165 |
| 406048332 | * 2/1994 | (JP) ..................................... 305/167 |

* cited by examiner

Primary Examiner—S. Joseph Morano
Assistant Examiner—Jason R. Bellinger
(74) Attorney, Agent, or Firm—Oliff & Berridge, PLC

(57) ABSTRACT

An inner periphery driving type rubber crawler comprises: a plurality of core metals buried in series in the rubber crawler along the longitudinal direction thereof such that the longer sides of each core metal are in parallel with the transverse direction of the crawler; a plurality of steel cords buried in the rubber crawler such that they surround the outer periphery of the core metals; a pair of horns which protrude from each core metal toward the inner side of the rubber crawler and which have a shape longer in said transverse direction than said longitudinal direction; and rubber members which cover sides of said horn in said longitudinal direction. The paired horns and the associated rubber members form a pair of driving protrusions. A sprocket of a driving wheel is inserted between the driving protrusions and is engaged with the protrusions via driving pins for transferring driving force to the rubber crawler. Rubber lugs are disposed in series at an outer peripheral face of the rubber crawler at an oblique angle such that one end of one lug is situated right above one metal core and the other end of the one lug is situated right above another metal core adjacent with the one metal core.

27 Claims, 14 Drawing Sheets

INNER PERIPHERY DRIVING TYPE RUBBER CRAWLER

BACKGROUND OF THE INVENTION

1. Field of the Invention

The present invention relates to improvement in an inner periphery driving type rubber crawler having driving protrusions which protrude from an inner face of the crawler.

2. Description of the Related Art

In a conventional structure of a rubber crawler, a plurality of core metals, which are arranged in series along the longitudinal direction of the crawler such that the longer sides of each core metal are in parallel with the width (transverse) direction of the crawler and the center of the core metal is aligned with the center in the transverse direction of the crawler, and a plurality of steel cords surrounding the outer periphery of the core metals, are disposed in a form wherein they are buried in rubber. The central portion of the core metal works as the part which engages with a sprocket (refer to FIG. 17). Therefore, the core metal has a shape in which the thickness increases toward the central portion and the central portion has the largest thickness. This shape markedly increases the weight of the core metal.

Holes to engage with the sprocket are formed between the core metals in combination with the parts to engage with a sprocket. Because of the presence of these holes, steel cords surrounding the core metals are buried in rubber at positions shifted toward both sides in the transverse direction. Therefore, it is necessary that the rubber crawler and the core metal have large widths.

In other words, a conventional structure of a rubber crawler inevitably gives a large weight to the whole crawler and it is difficult to increase the speed and to decrease the weight. Moreover, the driving force is transferred by the contact of the central portion of the core metal and the sprocket and thus the hitting sound generated by the contact of the metals of both parts becomes a major cause of noise. Holes to engage with the sprocket are arranged in a series at the central portion in the transverse direction of the rubber crawler and this causes another problem in that the arrangement of rubber lugs formed at the outer face of the rubber crawler is restricted. There is the possibility of this restriction in rubber lug arrangement becoming a critical point for decreasing vibration during running.

Particularly when a crawler is driven at a high speed, there is the possibility of the above problems of the conventional rubber crawlers causing problems. In order to solve the above problems, an inner periphery driving type rubber crawler is proposed, in which protrusions are formed at the inner face of a crawler at a constant pitch and the driving force is transferred from a sprocket by the engagement of the pins of the sprocket with these protrusions (refer to FIG. 18).

The inner periphery driving type rubber crawler has the advantage in that the crawler has a lighter weight than a conventional one because the crawler of this type generally does not have core metals buried therein and that generated vibration is smaller. Thus, the rubber crawler of this type has a structure more suitable for driving at a high speed than the crawler of the type shown in FIG. 17.

However, the inner periphery driving type rubber crawler has many things to be improved. For example, a driving wheel must have a structure in which the crawler is held down by the wheel at portions in the range of almost the entire width of the crawler because the crawler does not have core metals. Moreover, the driving wheel tends to accumulate dirt because the driving wheel has parts to engage with the driving protrusions.

The conventional inner periphery driving type rubber crawler has the additional problem that the pressure toward the earth in the transverse direction of the crawler cannot be held constant because no core metals are provided and thus a decrease in the pulling power arises and that the probability of wear and chipping of the driving protrusions increases by the contact with the driving wheel made of a metal because the driving protrusions formed at the inner face of the rubber crawler are made of rubber.

SUMMARY OF THE INVENTION

It is an object of the present invention to solve the above problems. The object is achieved by disposing core metals having a specific shape in a conventional inner periphery driving type rubber crawler.

In accordance with the first aspect of the present invention, there is provided an inner periphery driving rubber crawler which comprises a plurality of core metal which are buried in series in the rubber crawler along the longitudinal direction of the crawler such that the longer sides of each core metal are in parallel with the transverse direction of the crawler and the center of the core metal is aligned with the center in the transverse direction of the crawler, and a plurality of steel cords which are buried in the rubber crawler such that they surround the outer peripheries of the core metals.

This rubber crawler especially includes: a pair of horns which protrude from the core metal toward an inner side of the rubber crawler and which have a shape longer in said transverse direction than said longitudinal direction; and rubber members which cover sides of the horn in the longitudinal direction thereof, wherein the horns and the rubber members form a pair of driving protrusions.

In addition, there is provided a driving wheel comprising a sprocket which is inserted between the driving protrusions and driving pins which stand upright to the left and right sides of the sprocket, wherein the driving pins engage with the driving protrusions.

By the above aspect, the structure of the driving wheel is remarkably simplified. Moreover, noise decreases because the driving protrusions made of rubber are brought into contact with the driving pins and wear of the driving protrusions also decreases because the horn extending from the core metal is disposed over the entire area in the transverse direction of the driving protrusions.

In accordance with the second aspect of the present invention, a series of rubber lugs are disposed at an outer peripheral face of the rubber crawler at an oblique angle such that one end of a lug is situated right above one metal core and the other end of the lug is situated right above another metal core adjacent with the one metal core.

By the above aspect, the generation of vibration is more effectively suppressed.

In accordance with the third aspect of the present invention, along a central portion in a transverse direction of an inner face of the rubber crawler which extends in the longitudinal direction thereof, an inner face of the rubber crawler between adjacent core metals is more elevated toward the inside of the rubber crawler than an inner face of a central portion of a core metal between the driving protrusions and the inner face of a central portion of a core metal and the inner face of the rubber crawler are disposed approximately on the same plane.

By the above aspect, rotation of the sprocket can be made smoothly with little movement in the vertical direction.

In accordance with the fourth aspect of the present invention, grooves are formed at both ends in a longitudinal direction of an inner face of a central portion of the core metal.

By the above aspect, a strain formed by the rotation of the sprocket at an inner face of the rubber crawler between adjacent core metals is absorbed by the grooves and separation of adhesion interfaces between the core metals and the surrounding rubber members can effectively be prevented.

In accordance with the fifth aspect of the present invention, each horn has a hole which penetrates the horn in a longitudinal direction.

By the above aspect, when the rubber member is integrally molded with the horn at both longitudinal sides thereof, rubber penetrates into the hole to connect the rubber members at both sides through the holes and thus separation of the rubber members of the driving protrusion from the horn of the core metal is suppressed. Thus, the life of the rubber crawler can be extended.

DESCRIPTION OF THE PREFERRED EMBODIMENT

A first embodiment of an inner periphery driving type rubber crawler of the present invention will be described specifically in the following.

Figure 1:
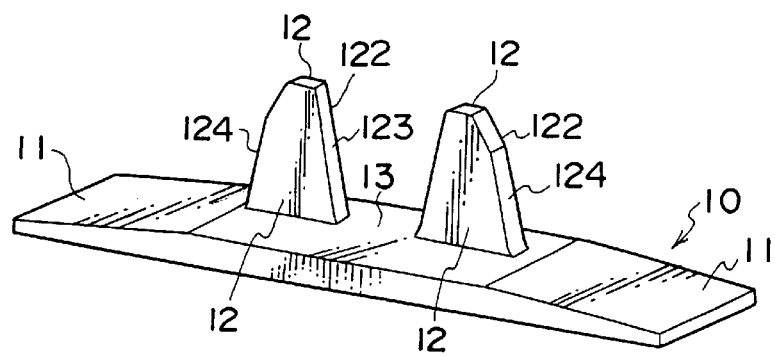
FIG. 1 shows a perspective view of a core metal used in the rubber crawler of the present invention.

FIG. 1 shows a perspective view of a core metal 10 used in the first embodiment of the inner periphery driving type rubber crawler. A plurality of pairs of wings 11, 11 (that is, a plurality of the core metals 10) are buried in the rubber crawler in series along the longitudinal direction of the crawler such that the longer sides of each core metal 10 are in parallel with the transverse direction of the crawler and the center of the core metal 10 is aligned with the center in the transverse direction of the crawler. A plurality of steel cores 22 are also buried in the rubber crawler such that they 22 surround the outer peripheries of the core metals 10.

A pair of the horns 12 are disposed at the upper face (the face which becomes the inner face when the core metal is placed in the rubber crawler) of the core metal 10. The widths $W_1$ of the horn 12 in the transverse (longer side) direction and the width $W_2$ of the horn 12 in the longitudinal (shorter side) direction have the relation: $W_1 > W_2$. (The directions are based on the directions in the rubber crawler when the core metal is placed in the rubber crawler. Thus, the transverse direction coincides with the direction to the right and the left of the horn and the longitudinal direction coincides with the direction to the front and the rear of the horn.) As described later, the front face 121 and the rear face 122 of the horn 12 are covered with a rubber member which are integral parts of the rubber crawler, to form a pair of driving protrusions. The side faces 123 and 124 of the horn 12 define a width of the driving protrusion in the transverse direction.

In the present embodiment, the thickness of the central portion 13 between the horns 12 and 12 is only slightly larger than the thickness of the wings 11 because the sprocket (refer to the description below) of a driving wheel does not directly engage with the central portion 13.

Figure 2:
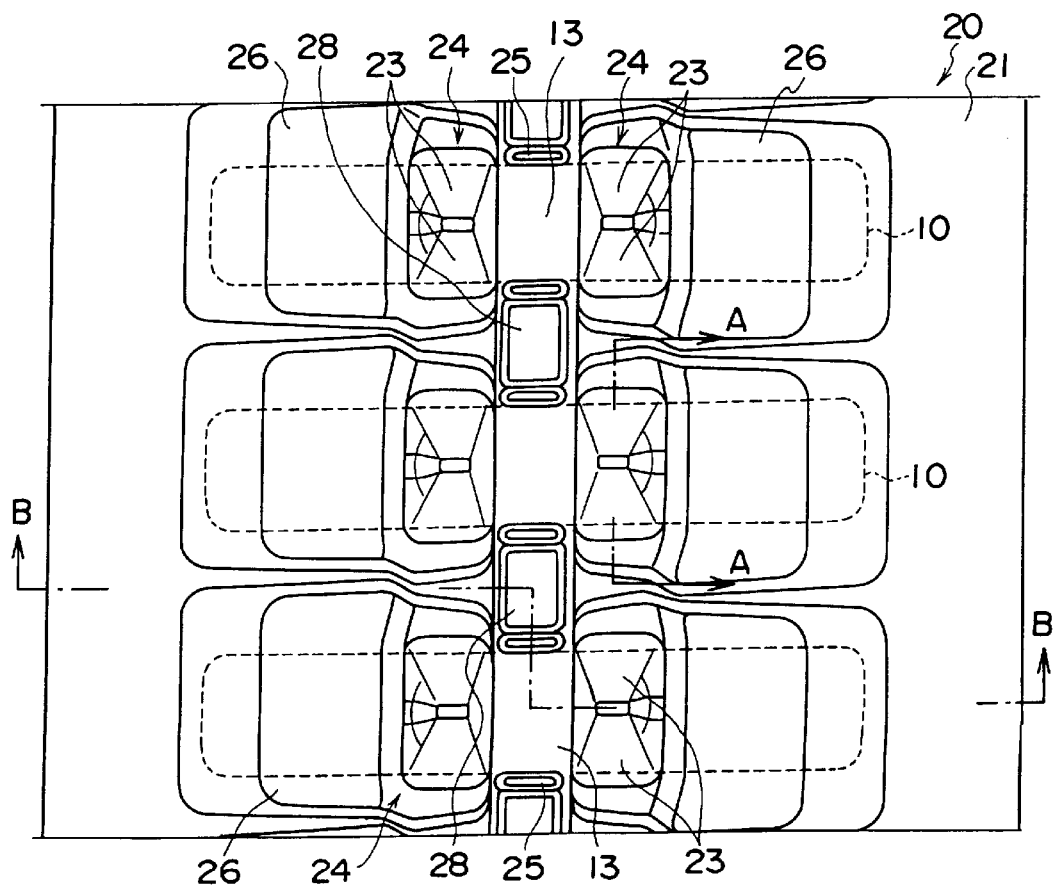
FIG. 2 shows a plane view of the inner face of the rubber crawler of the first embodiment of the present invention.
Figure 3:
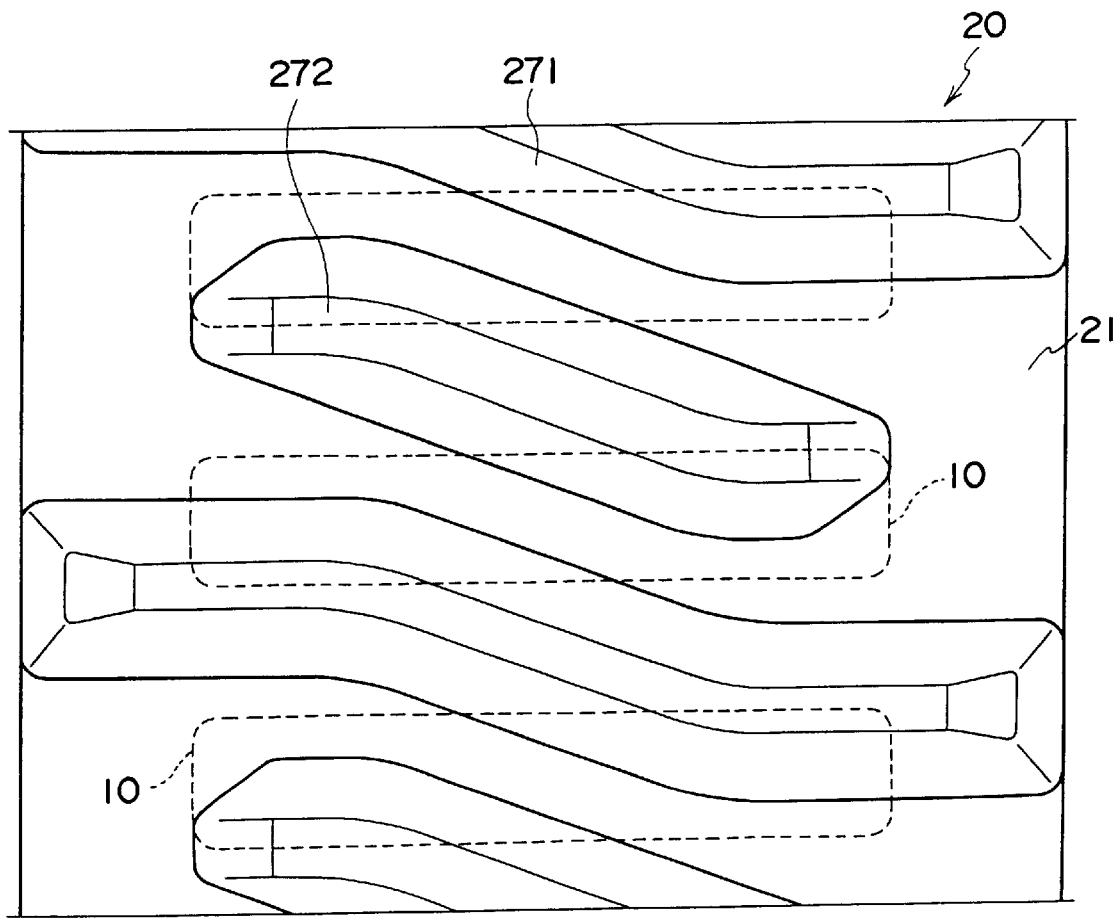
FIG. 3 shows a plane view of the outer face of the rubber crawler shown in FIG. 2.
Figure 4:
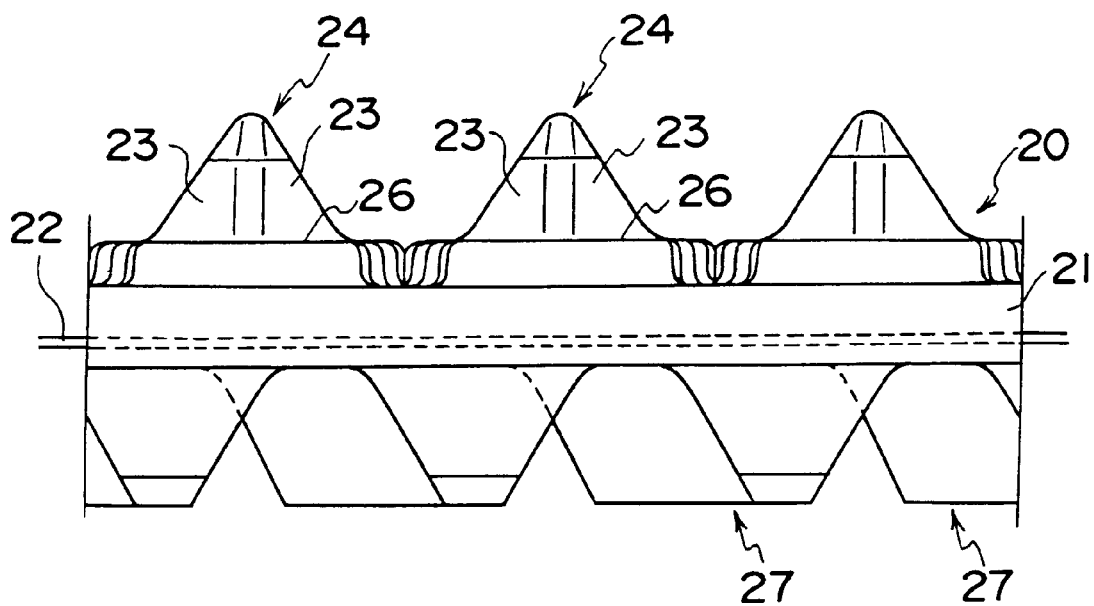
FIG. 4 shows a right side view of the rubber crawler shown in FIG. 2.
Figure 5:
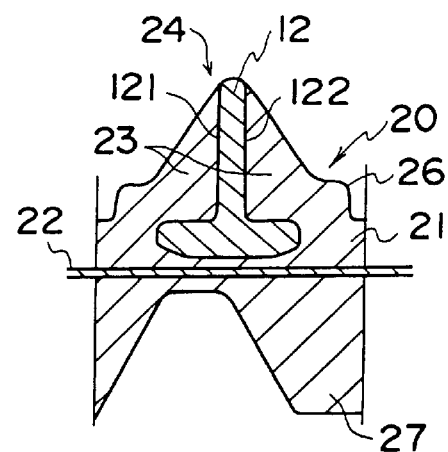
FIG. 5 shows a sectional view of the rubber crawler shown in FIG. 2 cut long the line A—A.
Figure 6:
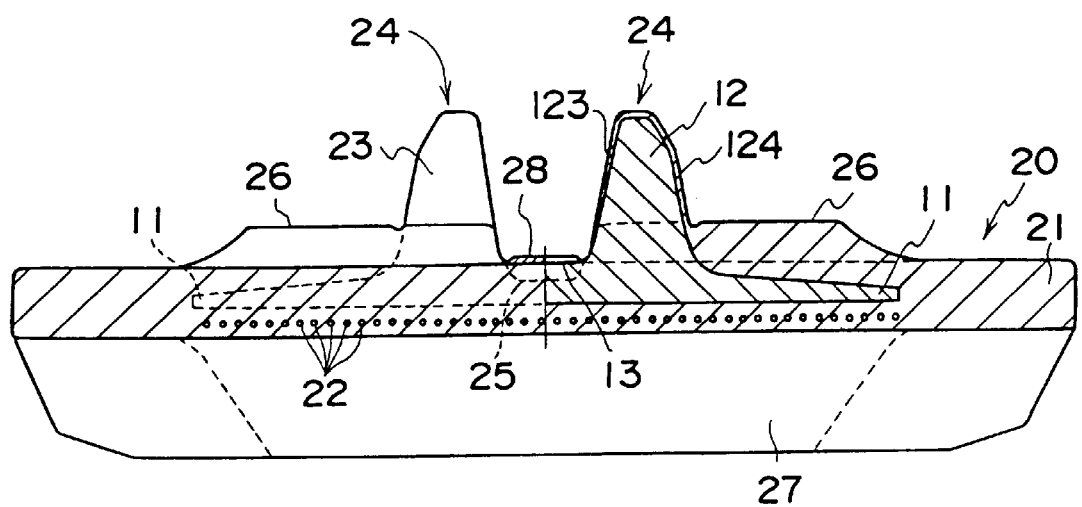
FIG. 6 shows a sectional view of the rubber crawler shown in FIG. 2 cut along the line B—B.

FIG. 2, FIG. 3 and FIG. 4 show a plane view of the inner face, a plane view of the outer face and a right side view, respectively, of the rubber crawler of the present example. FIG. 5 and FIG. 6 show sectional views cut along the line A—A and cut along the line B—B, respectively, of the rubber crawler. In the figures, the reference number 20 is a rubber crawler having an endless rubber elastomer (a main body of the rubber crawler) 21 as the base part. A pair of wings 11 of a core metal 10 is buried in the elastomer 21 and steel cords 22 are also buried therein at the periphery of the wing 11 such that the steel cords 22 surround the core metal 10.

On the front and rear faces 121 and 122 of the horn 12 of the core metal 10, rubber members 23 are formed integrally with the rubber elastomer 22 to cover the front and rear faces 121 and 122. As the result, a driving protrusion 24 of the rubber crawler is formed from the rubber members 23 and the horn 12.

The inner face of a central portion 13 of the core metal 10 and the inner face of the rubber crawler are disposed approximately on the same plane. Grooves 25 are formed at both ends in a longitudinal direction of an inner face of a central portion 13 of the core metal to decrease resistance to bending and to prevent formation of cracks in the rubber at the boundary of the core metal and the rubber member.

Figure 10:
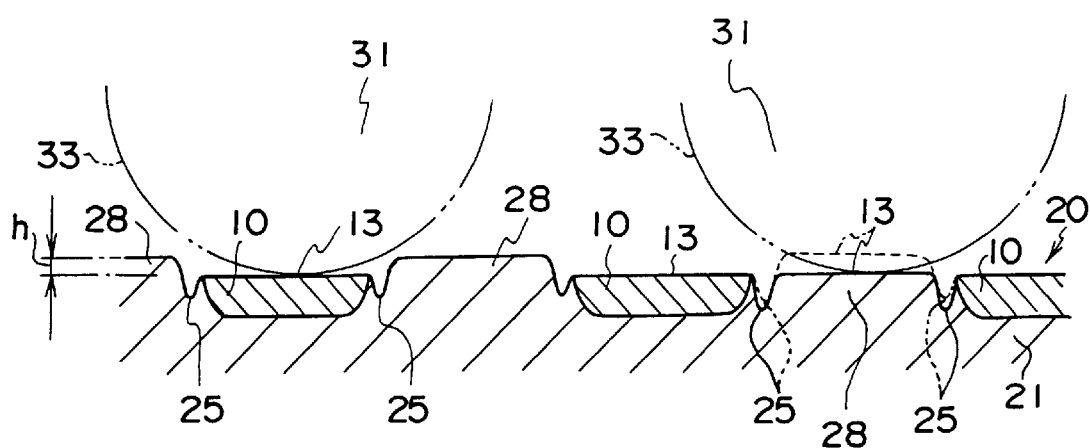
FIG. 10 shows a sectional view of the central portion of the rubber crawler shown in FIG. 2 and a driving wheel.

In the present embodiment, an inner face 28 of the rubber crawler between central portions 13 and 13 of adjacent core metals 10 and 10 is more elevated toward the inside of the rubber crawler than the central portion of the core metals 10 between the driving protrusions 24 and 24 by h (refer to FIG. 10).

As for the value of h described above, it is preferable that the height h is adjusted so that a sprocket and an idler of a driving wheel (refer to the description below) which engage with the rubber crawler can move smoothly without vertical movement from the central portion 13 of the core metal 10 to the inner face 28 of the rubber crawler where core metals 10 are absent and from the inner face 28 of the rubber crawler to the central portion 13 of the core metal.

At the right and left sides of the driving protrusion 24, faces for rotation 26 on which rollers (not shown in the figures) rotate are formed. At the outer face of the rubber crawler 20, a plurality of rubber lugs 27 having end portions extending in the transverse direction and a central portion disposed at an oblique angle with the transverse direction are disposed. In the present example, long lugs 271 and short lugs 272 are disposed alternately in areas each extending over the adjacent core metals 10 and 10 with an oblique angle to the transverse direction (refer to FIG. 3).

The main construction of the rubber crawler 20 of the present example is as described above. The driving protrusions 24 have the structure in which the rubber members 23 are formed on the front and rear faces of the horns 12 arranged in the transverse direction. The grooves 25 are formed at the front and rear ends of the central portion 13 of the core metal 10. The lugs 27 are disposed such that each extends over two adjacent core metals 10 and 10. Therefore, resistance to bending decreases and generation of vibration is reduced. The central portion 13 of the core metal 10 has a reduced thickness and the horn 12 is smaller than horns in conventional core metals. Therefore, the weight of the whole core metal 10 can be reduced.

Figure 7:
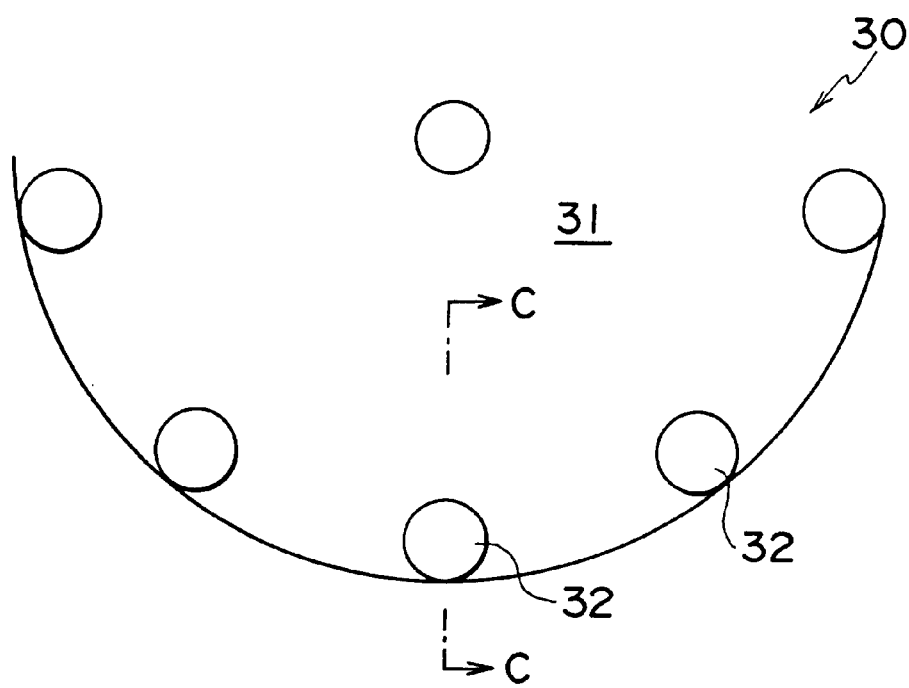
FIG. 7 shows a partially shown right side view of a driving wheel which engages with the rubber crawler of the present invention.
Figure 8:
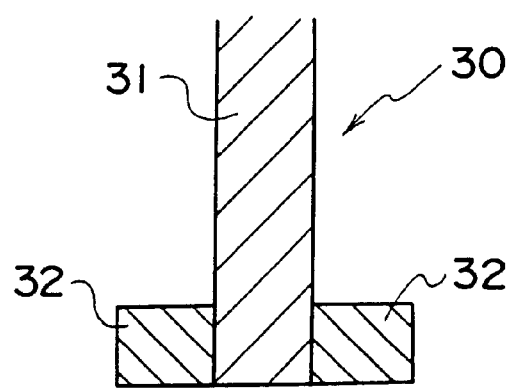
FIG. 8 shows a sectional view of the driving wheel shown in FIG. 7 cut along the line C—C.
Figure 9:
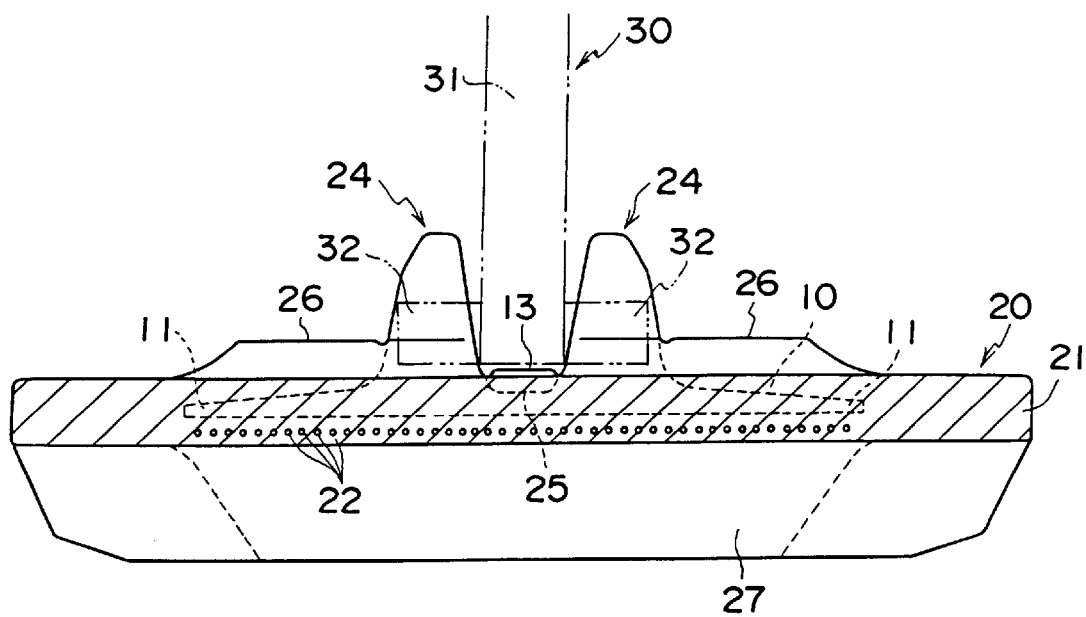
FIG. 9 shows a sectional view exhibiting engagement of a driving protrusion of the rubber crawler shown in FIG. 2 with the driving heel shown in FIG. 7.

FIG. 7 is a partially shown right side view of a driving wheel 30 which engages with the rubber crawler to drive the main body of the rubber crawler in the present invention. FIG. 8 shows a sectional view of this driving wheel. The driving wheel comprises a sprocket 31 which is inserted between the driving protrusions 24 of the rubber crawler 20 and driving pins 32 disposed on both side faces of the sprocket 31 at the peripheral portion thereof perpendicularly to the side faces. The driving pins 32 engage with the driving protrusions 24 to transfer the driving force as shown in FIG. 9.

When the driving force is transferred, the contact between the driving pin 32 and the driving protrusion 24 is actually achieved by the contact between the rubber member 23 covering the front and rear faces of the driving protrusion 24 and the driving pin 32 and there is no direct contact between metals. Therefore, advantages are obtained in that noise generated by this contact is small and that the horn 12 and the driving pin 32 suffer from almost no wear because the contact is achieved via the rubber member 23.

Due to the above construction, as shown in FIG. 10, the central portion 13 of the core metal 10 and the inner face 28 of the crawler between the core metals are alternately disposed in the longitudinal direction. The edge portion 33 of the sprocket 31 rides on the central portion 13 and the inner face 28 alternately.

When the sprocket 31 rotates, in general, the sprocket 31 does not sink much into the central portion 13 of the core metal 10 but sinks considerably into the inner face 28 of the rubber crawler made of rubber. However, in the present embodiment, the level of the inner face 28 of the rubber crawler is constructed higher than the level of the central portion 13 of the core metal 10 by h as described above. Therefore, the sprocket 31 rotates smoothly showing little vertical movement in the rotation. Thus, unlike conventional rubber crawlers, climbing of the sprocket and the idler on the core metal from the sunken position between the core metals can be prevented and noise and vibration (which is very uncomfortable for an operator) generated in conventional rubber crawlers in such a case can be remarkably reduced.

In other words, in the present embodiment, the sinking of the sprocket 31 (and/or the idler) at the inner face 28 is effectively improved.

This advantage of the present embodiment can be more remarkably exhibited by the effect of the grooves 25 formed along the front and rear ends of the central portion 13 of the core metal 10.

Needless to say, the simplified structure of the driving wheel 30 brings about an advantage of easier production of the driving wheel. Moreover, an advantage can be expected in that entanglement of fiber materials such as grasses and straws is reduced and the troubles due to such entanglement (the crawler's coming off the vehicles etc.) can be prevented almost completely.

To summarize the advantages obtained in the first embodiment of the present invention, noise is reduced and wear of the driving pin and the driving protrusion can be almost eliminated because the driving pin and the driving protrusion are brought into contact with each other via the rubber member. Wear of the side faces of the driving protrusion can be prevented particularly effectively because the horn is disposed in a shape extending from the core metal along the entire width of the driving protrusion. Moreover, the structure of the driving wheel can be simplified.

Figure 12:
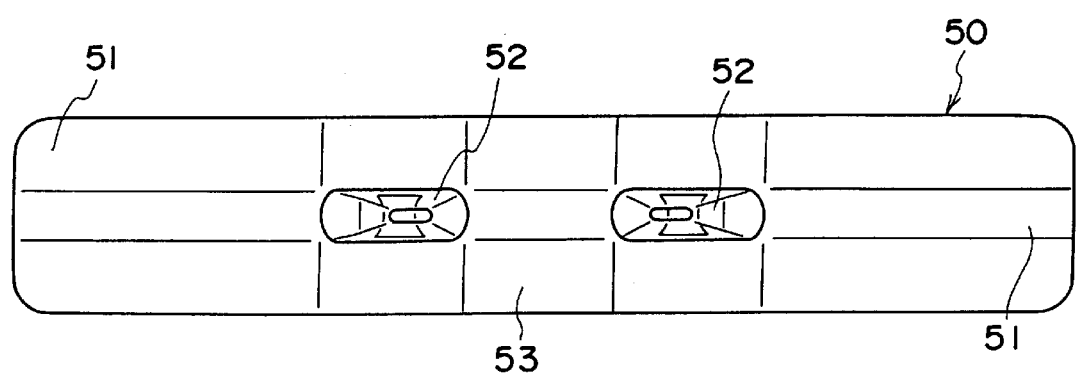
FIG. 12 shows a plane view of a core metal used in the rubber crawler of the second embodiment of the present invention.
Figure 13:
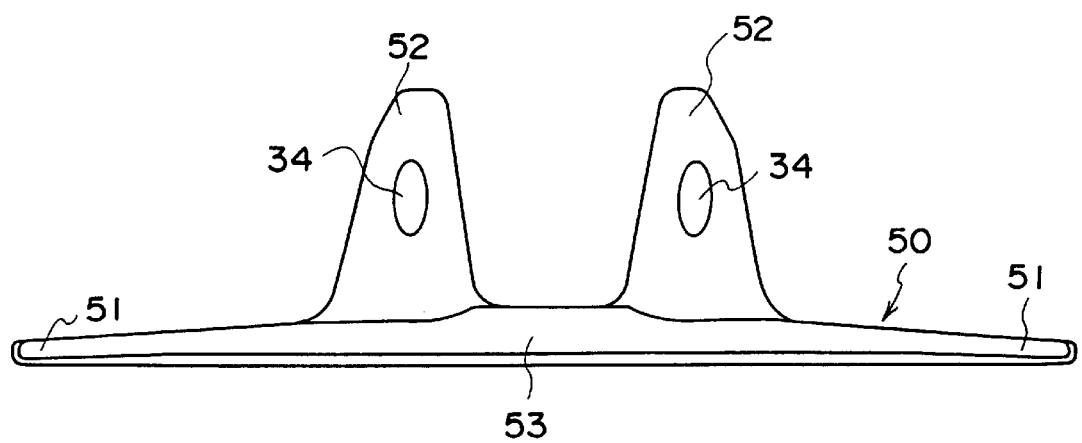
FIG. 13 shows a front view of the core metal shown in FIG. 12.

The second embodiment of the inner periphery driving type rubber crawler of the present invention will be described in the following with reference to FIGS. 11 to 13.

The present embodiment is fundamentally the same as the first embodiment described above except that, in the present embodiment, the horn of a core metal which forms the core of the driving protrusion has a hole therein which penetrates the horn from the front face to the rear face. Due to the presence of the hole, rubber members which are adhered to the front and rear faces of the horn are connected to each other through the hole when the rubber crawler is formed and cured so that the core metals are buried into the rubber crawler. Accordingly, separation of the rubber members from the horn of the core metal is suppressed.

Figure 11:
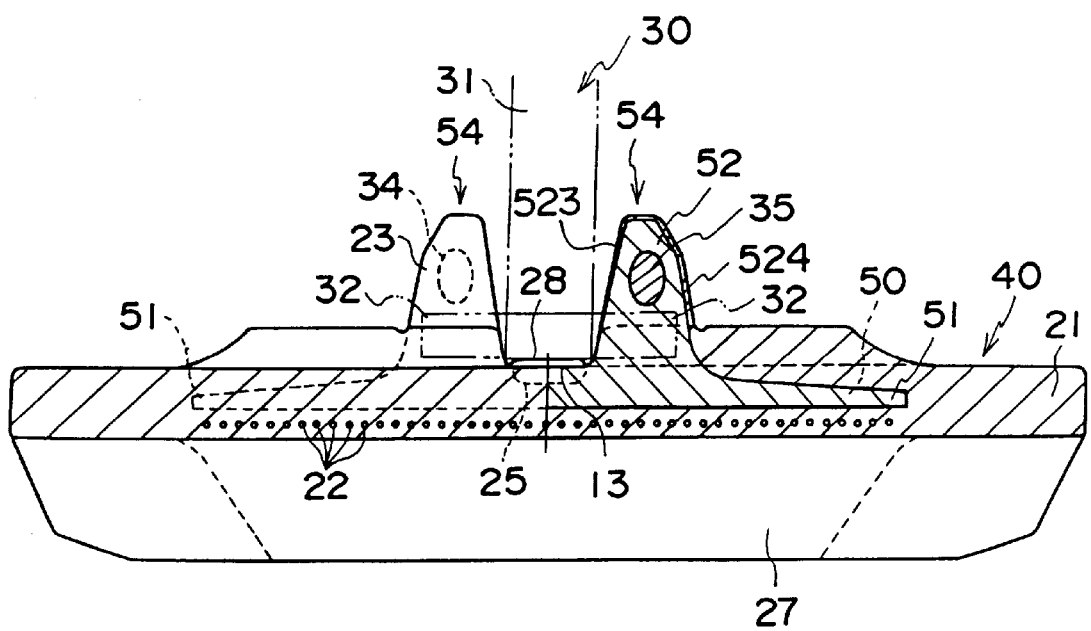
FIG. 11 shows a sectional view of the rubber crawler of the second embodiment of the present invention similar to the view shown in FIG. 6.

FIG. 11 shows a sectional view of the rubber crawler 40 of the present embodiment cut in a manner similar to FIG. 6. FIG. 12 shows a plane view of a core metal used in the rubber crawler 40 of the present embodiment. FIG. 13 shows a front view of this core metal. In the present embodiment, the same constituting elements as those in the first embodiment are referred to by the same reference numbers as those used in the first embodiment and specific descriptions thereof will be omitted.

In the figures, 40 is a rubber crawler having an endless rubber elastomer 21 as the base part. Wings 51 of a core metal 50 are buried in the rubber elastomer 21 and steel cords 22 are buried near to a periphery of the wings 51 to surround the core metal 50 in the same way as the wings 11 and the steel cords 22 in the first embodiment. On the front and rear faces of the horn 52 of the core metal 50, rubber members 23 are formed integrally with the rubber elastomer 21 to cover the front and rear faces. A driving protrusions 54 is formed from the rubber members 23 and the horn 52.

The core metal 50 of the present embodiment will be described more specifically. On the wings 51, a pair of horns 52 are formed as shown in FIG. 13. The width $W_1$ of the horn 52 in the transverse (longer side) direction and the width $W_2$ of the horn 52 in the longitudinal (shorter side) direction have the relation: $W_1 > W_2$. The width $W_1$ in the transverse direction of the core metal 52 is about the same as the width in the transverse direction of the driving protrusion 54. Side faces 523 and 524 of the horn 52 define the width in the transverse direction. In the horn 52, a penetrating hole 34 having an elliptical cross-section is formed in the longitudinal direction.

It is sufficient that the thickness of the central portion 53 between the horns 52 and 52 is only slightly larger than that of the wing 51 because this portion is not the part for transfer of force, i.e., the sprocket or the like of a driving wheel does not directly engage with this portion.

As shown in FIG. 11, a penetrating hole 34 having an elliptical cross-section is formed in the horn 52 of the core metal 50 in the longitudinal direction of the core metal. When the rubber crawler of the present example is formed and cured, the core metal 50 and steel cords 22 are first set in a lower mold and, after filling the mold with uncured rubber, the rubber members 23 and 23 are integrally formed on the front and rear faces of the horn 52. During this process, the rubber goes into the penetrating hole 34 (this rubber portion becomes the connecting portion of rubber 35) of the core metal 52 and, as the result, the rubber members 23 and 23 on both front and rear sides of the horn are connected to each other.

In the present embodiment, in the same manner as that in the first embodiment, a sprocket 31 of a driving wheel 30 is inserted between the driving protrusions 54 and 54 and driving pins 42 disposed at the edge portions of the sprocket 31 engage with the driving protrusion 54 and 54 to transfer the driving force.

When the sprocket 31 is rotated between the driving protrusions 54 and 54 by the driving of the driving wheel 30, the rubber members 23 and 23 covering the front and rear faces of the horn 52 are constantly under the strain caused by the transfer of force from the driving pins 42. There is thus the possibility of separation of adhesion of the rubber member 23 and the horn 52 occurring at the interface due to the continuing strain over a long period of time.

However, in the present embodiment, the rubber member 23 is kept covering the horn 52 without being easily separated or detached because of the presence of the connecting portion of the rubber 35 even when the rubber member 23 and the horn 52 are separated at the interface of adhesion. Thus, durability of the rubber crawler can be achieved. In the present embodiment, only a single penetrating hole 34 is formed. However, the present invention is not limited to this structure and a plurality of the penetrating holes may be formed at suitable positions. Of course, the shape of the penetrating hole 34 is not particularly limited.

It is apparent in the present embodiment that the same advantageous effects as those achieved by the first embodiment can be achieved. For example, noise and vibration can be reduced because of the absence of the contact between metals.

Next, a third embodiment of the inner periphery driving type rubber crawler of the present invention will be described below with reference to FIGS. 14 to 16.

The present embodiment is fundamentally the same as the first embodiment except that, in the present embodiment, the tip end portion of the horn of a core metal (the horn forms the core of the driving protrusion) is formed to have an umbrella-like shape. As the tip end of the horn is formed in such a shape, the rubber member, which is integrally formed with the rubber elastomer (a main body of the rubber crawler) to cover the horn, more firmly engages with the horn. In other words, the rubber member at the tip end of the horn is effectively prevented from coming off the horn, even if the driving protrusions and the driving pins of the driving wheel repeatedly contact each other.

Figure 14:
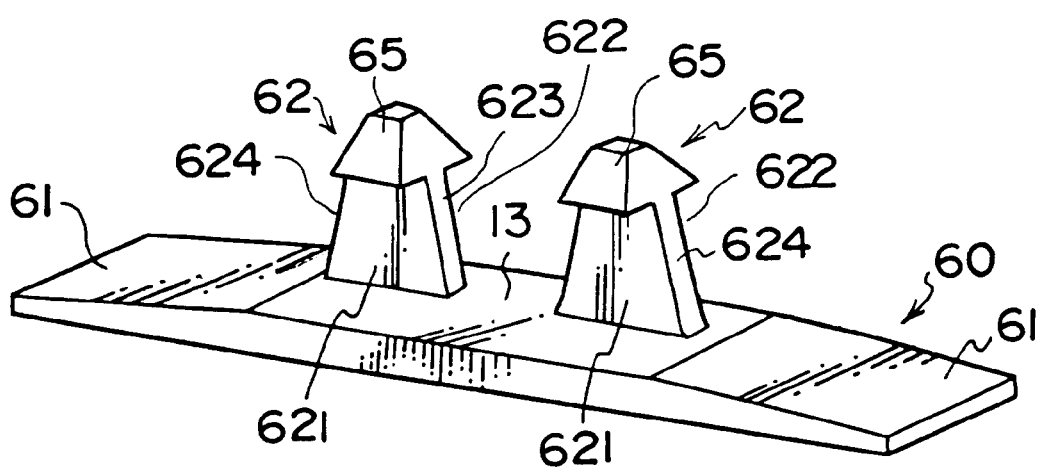
FIG. 14 shows a perspective view of a core metal used in the rubber crawler of a third embodiment of the present invention similar to the view shown in FIG. 1.
Figure 15:
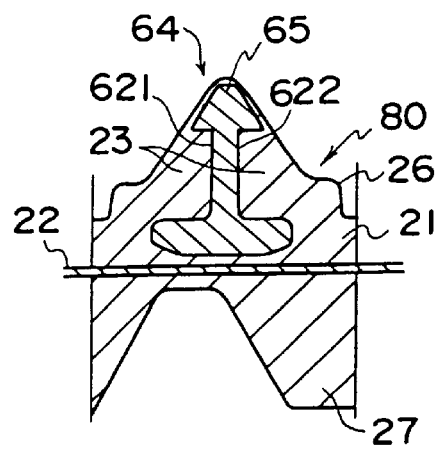
FIG. 15 shows a sectional view of the rubber crawler of the third embodiment of the present invention similar to the view shown in FIG. 5.

FIG. 14 is a perspective view, which is similar to the view shown in FIG. 1, of a core metal 60 used in a rubber crawler 80 of the present embodiment. FIG. 15 shows a sectional view of the rubber crawler 80 of the present embodiment similar to the view shown in FIG. 5. FIG. 16 is a sectional view of the rubber crawler 80 similar to the view shown in FIG. 6.

In the present embodiment, the same constitutuent elements as those in the first embodiment are referred to by the same reference numbers as those used in the first embodiment and specific descriptions thereof will be omitted.

Refer to FIG. 14. The core metal 60 used in the inner periphery driving type rubber crawler 80 of the present embodiment includes a pair of wings 61, 61 extending in the left-right direction (the transverse direction when disposed in the rubber crawler) and a pair of horns 62, 62 disposed at the upper face (the face which becomes the inner face when the core metal 60 is placed in the rubber crawler) of the core metal 60.

Figure 16:
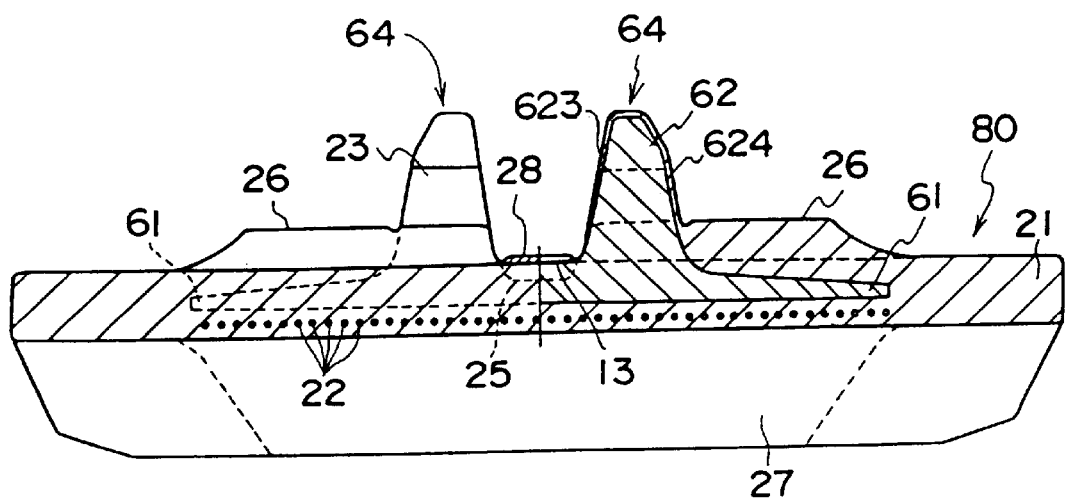
FIG. 16 shows a sectional view of the rubber crawler of the third embodiment of the present invention similar to the view shown in FIG. 6.
Figure 17:
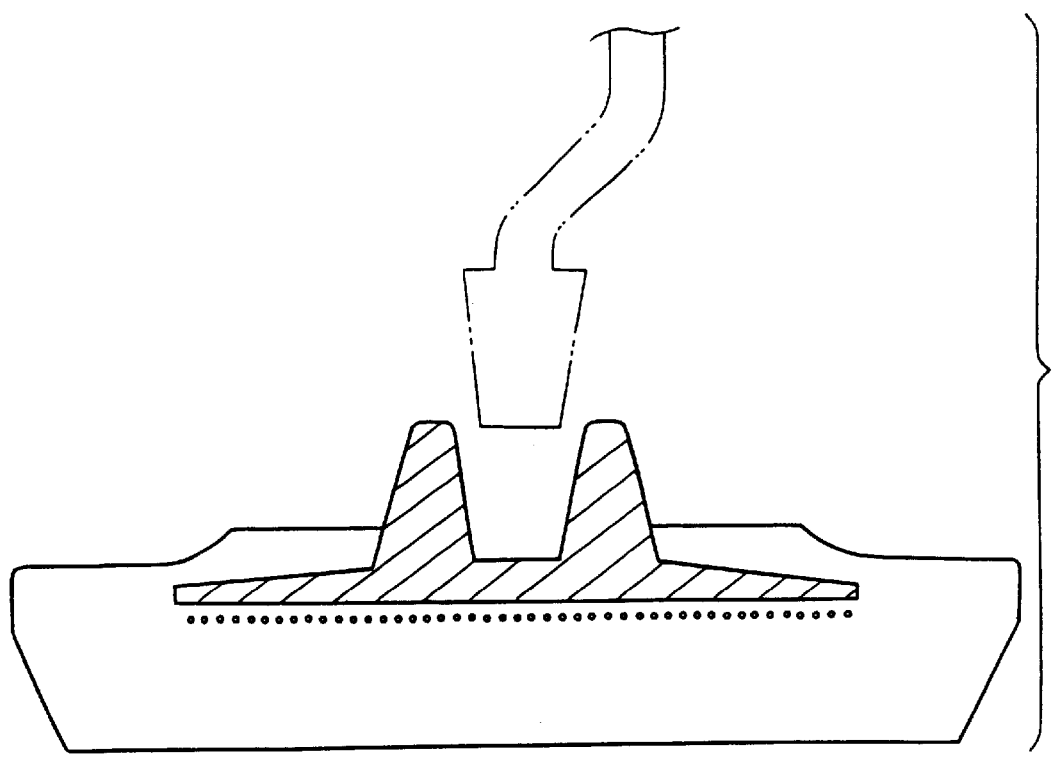
FIG. 17 shows a sectional view of a conventional rubber crawler.
Figure 18:
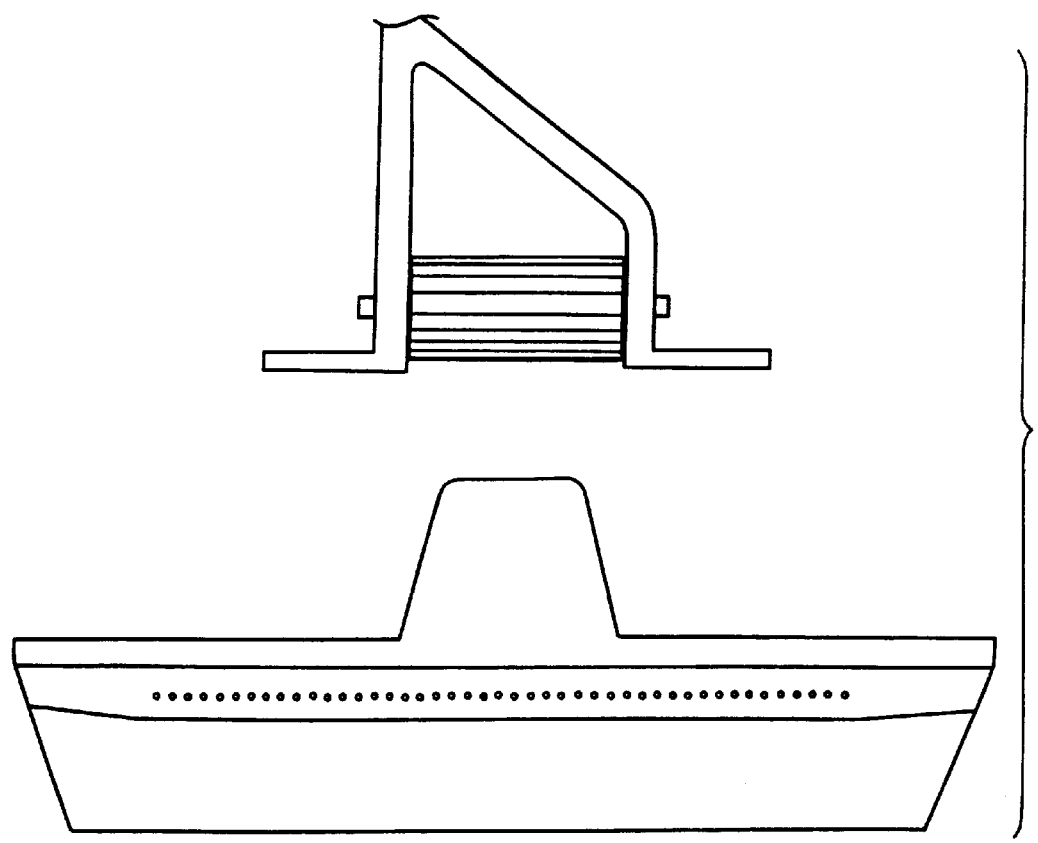
FIG. 18 shows a sectional view of a conventional rubber crawler.

Similar to the core metal 10 the first embodiment, the wings 61 of the core metal 60 are buried in a series in the rubber crawler main body 21 along the longitudinal direction thereof and a plurality of steel cords 22 are buried in the rubber crawler such that the steel cords 22 are at the outer periphery side of the wings 61 (refer to FIG. 16).

Similar to the horns 12 in the first embodiment, the width $W_1$ of the horn 62 in the transverse (longer side) direction and the width $W_2$ of the horn 62 in the longitudinal (shorter side) direction have the relation: $W_1 > W_2$. A front face 621 and a rear face 622 of the horn 62 are covered with the rubber member which is integral with the rubber crawler, to form the pair of driving protrusions. Side faces 623 and 624 of the horn 62 define the width in the transverse direction of each driving protrusion.

A tip end portion 65 of the horn 62 of the present embodiment is formed to have an umbrella-like shape as shown in FIG. 14, in which the end width is enlarged in the longitudinal direction. In the present embodiment, the tip end portion 65 of the horn 62 is enlarged only in the longitudinal direction, that is, only with respect to the front face 621 and the rear face 622, but not with respect to the side faces 623 and 624.

Due to this tip end portion 65 substantially shaped like an umbrella, the rubber member 23 which is integrally formed with the front and rear faces 621 and 622 of the horn 62 is "hooked" by the periphery of the tip end portion. 65 (refer to FIG. 15), and the horn 62 and the rubber member 23 are very fittingly engaged with each other. Accordingly, the rubber at the tip end portion of the horn is prevented from coming off the horn, even in a condition in which a harsh contact between the driving pins 32 of the driving wheel 30 and the driving protrusions 64 is repeated.

In addition, due to this umbrella-like, thickened shape of the tip end portion 65, the structural strength of the horn 62 is significantly increased and thus breakage of the horn 62 will less likely to occur, even in a condition in which contact between the driving pins 32 of the driving wheel 30 and the driving protrusions 64 is repeated.

In the present embodiment, the tip end portion 65 of the horn 62 is formed to have an umbrella-like shape. However, the present invention is not limited to this example, and the tip end portion of the horn may be structured in any shape that can effectively prevent the rubber at the tip end portion of the horn from coming off the horn.

The sprocket 31 of the driving wheel 30 is inserted between the driving protrusions 64, 64, and the driving pins 32, which are disposed at peripheral portions at both side faces of the sprocket 31, engage with the driving protrusions 64 to transfer driving force. Other features of the present embodiment are the same as that of the first embodiment and thus explanation thereof will be omitted.

In summary, in the present embodiment, as the tip end portion of the horn is formed to have an umbrella-like shape, the rubber at the tip end of the horn is less likely to come off and breakage in the horn is less likely to occur. In addition, it is apparent that in the present embodiment the same advantageous effects as those achieved by the first embodiment can be achieved. For example, noise and vibration can be reduced because of absence of contact between metals.

What is claimed is:

1. An inner periphery driving type rubber crawler for use with a vehicle having a driving wheel, the driving wheel having a sprocket and driving pins which stand upright to the sides of the sprocket comprising:
    a plurality of core metals having a substantially rectangular base which are buried in series in the rubber crawler along the longitudinal direction thereof such that the longer sides of each core metal are in parallel with the transverse direction of the crawler and the center of each core metal is aligned with the center in the transverse direction of the crawler;
    a plurality of steel cores which are buried in the rubber crawler such that said steel cords surround the outer periphery of the core metals;
    a pair of horns which protrude from said core metal toward the inner side of the rubber crawler and which have a shape longer in said transverse direction than said longitudinal direction; and
    rubber members which cover sides of said horn in said longitudinal direction,
    wherein said pair of horns and said rubber members form a pair of driving protrusions.

2. An inner periphery driving type rubber crawler according to claim 1, wherein a plurality of rubber lugs are disposed in series at an outer peripheral face of the rubber crawler at an oblique angle such that one end of one lug is situated opposite one metal core and the other end of the one lug is situated opposite another metal core adjacent with the one metal core.

3. An inner peripheral driving type rubber crawler according to claim 1, wherein the protrusions of rubber crawler are engagable by a driving wheel.

4. An inner periphery driving type rubber crawler according to claim 1, wherein, along a central portion in said transverse direction of an inner peripheral face of the rubber crawler which extends in said longitudinal direction thereof, an inner peripheral face of the rubber crawler between adjacent core metals is more elevated toward the inside of the rubber crawler than an inner peripheral face of a central portion of each core metal between the driving protrusions.

5. An inner periphery driving type rubber crawler according to claim 4, wherein the inner peripheral face of a central portion of each core metal and the inner peripheral face of the rubber crawler are disposed approximately on the same plane.

6. An inner periphery driving type rubber crawler according to claim 1, wherein grooves are formed at both ends in said longitudinal direction of the inner peripheral face of a central portion of the core metal.

7. An inner periphery driving type rubber crawler according to claim 1, wherein the horn has holes which penetrate the horn in said longitudinal direction.

8. An inner periphery driving type rubber crawler according to claim 1, wherein the tip end portion of the horn is enlarged in the longitudinal direction such that the portion has an umbrella-like shape.

9. An inner periphery driving type rubber crawler for use with a vehicle having a driving wheel, the driving wheel having a sprocket and driving pins which stand upright to the sides of the sprocket, comprising:
    a main body of the rubber crawler;
    a plurality of core metals having a substantially rectangular base which are buried in series in the rubber crawler along the longitudinal direction thereof such that the longer sides of each core metal are in parallel with the transverse direction of the crawler and the center of each core metal is aligned with the center in the transverse direction of the crawler; and
    a plurality of rubber lugs disposed in series at an outer peripheral face of the rubber crawler at an oblique angle such that one end of one lug is situated right above one metal core and the other end of the one lug is situated right above another metal core adjacent with the one metal core.

10. An inner periphery driving type rubber crawler according to claim 9, further comprising:
    a plurality of steel cords which are buried in the rubber crawler such that said steel cords surround the outer periphery of the core metals;
    a pair of horns which protrude from said core metal toward the inner side of the rubber crawler and which have a shape longer in said transverse direction than said longitudinal direction; and
    rubber members which cover sides of said horn in said longitudinal direction,
    wherein said pair of horns and said rubber members form a pair of driving protrusions.

11. An inner periphery driving type rubber crawler according to claim 9, wherein the protrusions of the rubber crawler are engagable by a driving wheel.

12. An inner periphery driving type rubber crawler according to claim 9, wherein, along a central portion in said transverse direction of an inner peripheral face of the rubber crawler which extends in said longitudinal direction thereof, an inner peripheral face of the rubber crawler between adjacent core metals is more elevated toward the inside of the rubber crawler than an inner peripheral face of a central portion of each core metal between the driving protrusions.

13. An inner periphery driving type rubber crawler according to claim 12, wherein the inner peripheral face of a central portion of each core metal and the inner peripheral face of the main body of the rubber crawler are disposed approximately on the same plane.

14. An inner periphery driving type rubber crawler according to claim 9, wherein grooves are formed at both ends in said longitudinal direction of the inner peripheral face of a central portion of the core metal.

15. An inner periphery driving type rubber crawler according to claim 9, wherein the horn has holes which penetrate the horn in the longitudinal direction.

16. An inner periphery driving type rubber crawler according to claim 9, wherein the tip end portion of the horn is enlarged in the longitudinal direction such that the portion has an umbrella-like shape.

17. An inner periphery driving type rubber crawler for use with a vehicle having a driving wheel, the driving wheel having a sprocket and driving pins which stand upright to the sides of the sprocket comprising:

a plurality of core metals having a substantially rectangular base which are buried in series in the rubber crawler along the longitudinal direction thereof such that the longer sides of each core metal are in parallel with the transverse direction of the crawler and the center of each core metal is aligned with the center in the transverse direction of the crawler;

a pair of horns which protrude from said core metal toward the inner side of the rubber crawler and which have a shape longer in said transverse direction than said longitudinal direction; and rubber members which cover sides of said horn in said longitudinal direction, wherein said pair of horns and said rubber members form a pair of driving protrusions, and along a central portion in said transverse direction of an inner peripheral face of the rubber crawler which extends in said longitudinal direction thereof, an inner peripheral face of the rubber crawler between adjacent core metals is more elevated toward the inside of the rubber crawler than an inner peripheral face of a central portion of each core metal between the driving protrusions.

18. An inner periphery driving type rubber crawler according to claim 17, wherein the inner peripheral face of a central portion of each core metal and the inner peripheral face of the rubber crawler are disposed approximately on the same plane.

19. An inner periphery driving type rubber crawler according to claim 17, wherein a plurality of rubber lugs are disposed in series at an outer peripheral face of the rubber crawler at an oblique angle such that one end of one lug is situated opposite one metal core and the other end of the one lug is situated opposite another metal core adjacent with the one metal core.

20. An inner periphery driving type rubber crawler according to claim 17, wherein the protrusions of the rubber crawler are engagable by a driving wheel.

21. An inner periphery driving type rubber crawler according to claim 17, wherein grooves are formed at both ends in said longitudinal direction of the inner peripheral face of a central portion of the core metal.

22. An inner periphery driving type rubber crawler according to claim 17, wherein the tip end portion of the horn is enlarged in the longitudinal direction such that the portion has an umbrella-like shape.

23. An inner periphery driving type rubber crawler for use with a vehicle having a driving wheel, the driving wheel having a sprocket and driving pins which stand upright to the sides of the sprocket comprising:

a plurality of core metals having a substantially rectangular base which are buried in series in the rubber crawler along the longitudinal direction thereof such that the longer sides of each core metal are in parallel with the transverse direction of the crawler and the center of each core metal is aligned with the center in the transverse direction of the crawler;

a plurality of steel cords which are buried in the rubber crawler such that said steel cords surround the outer periphery of the core metals;

a pair of horns which protrude from said core metal toward the inner side of the rubber crawler and which have a shape longer in said transverse direction than said longitudinal direction; and rubber members which cover sides of said horn in said longitudinal direction, wherein said pair of horns and said rubber members form a pair of driving protrusions, and each horn has holes which penetrate said horn in said longitudinal direction.

24. An inner periphery driving type rubber crawler according to claim 23, wherein a plurality of rubber lugs are disposed in series at an outer peripheral face of the rubber crawler at an oblique angle such that one end of one lug is situated opposite one metal core and the other end of the one lug is situated opposite another metal core adjacent with the one metal core.

25. An inner periphery driving type rubber crawler according to claim 23, wherein the protrusions of the rubber crawler are engagable by a driving wheel.

26. An inner periphery driving type rubber crawler according to claim 23, wherein grooves are formed at both ends in said longitudinal direction of the inner peripheral face of a central portion of the core metal.

27. An inner periphery driving type rubber crawler according to claim 23, wherein the tip end portion of the horn is enlarged in the longitudinal direction such that the portion has an umbrella-like shape.

* * * * *